United States Patent [19]

Le Corre

[11] Patent Number: 5,056,084

[45] Date of Patent: Oct. 8, 1991

[54] SYSTEM FOR TRANSMITTING HDLC FRAMES ON A PCM TYPE LINK USING A SINGLE HDLC CIRCUIT AND A TRANSPOSITION BUFFER MEMORY

[75] Inventor: Noël Le Corre, Saint Michel, France

[73] Assignee: Alcatel Cit, Paris, France

[21] Appl. No.: 459,223

[22] Filed: Dec. 29, 1989

[30] Foreign Application Priority Data

Dec. 30, 1988 [FR] France .................. 88 17504

[51] Int. Cl.⁵ ............................................ H04L 5/22
[52] U.S. Cl. ....................................... 370/99; 370/102
[58] Field of Search ............... 370/79, 102, 112, 99

[56] References Cited

U.S. PATENT DOCUMENTS

| | | | |
|---|---|---|---|
| 4,531,211 | 7/1985 | Hadziomerovic | 370/102 |
| 4,542,498 | 9/1985 | Bodros et al. | 370/79 |
| 4,597,074 | 6/1986 | Demichelis et al. | 370/79 |
| 4,958,342 | 9/1990 | Williams et al. | 370/102 |

FOREIGN PATENT DOCUMENTS 0100092 2/1984 European Pat. Off. .
0275743 7/1988 European Pat. Off. .
2516730 5/1983 France .

Primary Examiner—Douglas W. Olms
Assistant Examiner—Melvin Marcelo
Attorney, Agent, or Firm—Sughrue, Mion, Zinn, Macpeak & Seas

[57] ABSTRACT

A system for transmitting HDLC frames on a PCM type link uses a single HDLC circuit and a transposition buffer memory to provide a compact system by economizing on the number of components, enabling operation at high speed without risk of starvation on the PCM link. The system uses a single transposition buffer memory with a read cycle distinct from the write cycle cooperating with a single single-channel HDLC frame formatting circuit. The memory is written with the formatted HDLC frames and read under the control of means for selective sampling in the memory of data for building successive blocks of interleaved channels of the PCM frame.

13 Claims, 4 Drawing Sheets

SYSTEM FOR TRANSMITTING HDLC FRAMES ON A PCM TYPE LINK USING A SINGLE HDLC CIRCUIT AND A TRANSPOSITION BUFFER MEMORY

BACKGROUND OF THE INVENTION

1. Field of the invention

The invention concerns data transmission, in the telecommunications field, in accordance with the ISO standard protocol, and more particularly in accordance with levels 1 and 2 of the standard.

2. Description of the prior art

The specific implementation behind the development of the invention concerns an HDLC (High-level Data Link Control) transmitter with 32 channels multiplexed onto a PCM link and integrated into a PCM controller associated with a data switch, for example.

However, the invention encompasses other implementations in which an ISO level 2 frame format (in place of the HDLC format) is combined with multiplexing of multiple formatted channels onto the transmission link (in place of the PCM technique).

One example of the use of PCM multiplexing of HDLC frames is the TRANSPAC (registered trademark) network which uses the X.25 protocol.

HDLC encoding entails formatting the data into successive identifiable frames each comprising a frame validation symbol on two bytes (signature based on the bits of the frame) that is checked at the receiving end.

The PCM transmission technique time-division multiplexes N independent logical channels onto a single physical transmission pair in the form of PCM frames each identified by a PCM frame start/end byte. Within each PCM frame each channel is reserved the same byte of predetermined rank.

The insertion of the HDLC frames into the PCM format at the transmitting end and then the recovery of each channel at the receiving end presupposes the provision of a specific system at each end of the transmission system. The invention concerns the transmit part of a system of this kind.

There are already known systems for transmitting HDLC frames on PCM type channels comprising 16 or 32 separate transmitters or multiple automatic devices each associated with 16 or 32 words of RAM. In the known system shown in FIG. 4 the HDLC formatting is done, on a per-channel basis, by means of a specific line for each of the channels comprising a dedicated HDLC circuit 41 and a dedicated processor 42 associated with a buffer memory 43. Each of the lines 44 corresponding to a separate channel feeds a common multiplexer 45 which constructs the PCM frame.

This existing system is fully operational but has the disadvantages of a large number of components (one component for each channel) and the resulting complexity of management.

These disadvantages are particularly constricting in developing switching systems for a very large number of lines carrying large amounts of digital data. Until recently, 32-channel PCM links carried a limited number of logical channels (two, for example), the other channels being speech channels. It was therefore feasible, and sometimes essential, to process each channel separately, the multiplication of the components 41, 42, 43 on just a few parallel channels being compensated by the resulting flexibility of configuration.

There are now being developed PCM type transmit/receive systems comprising only digital channels. For example, the signalling transfer points (STP) designed to be installed on the French public switched telephone network require a processing capacity in the order of 500 64 kbit/s HDLC channels.

The increasing digitization of the network and rising data signalling rates are now making it possible to introduce services offering increasingly superior performance (ISDN) and represent a clear requirement for better performance PCM/HDLC systems.

An objective of the invention is to provide a system which can meet these requirements whilst being economical in terms in the number of components used, and in particular the number of HDLC formatting components. The system in accordance with the invention also makes it possible to save on the use of a data multiplexer on the PCM link.

The invention also makes it possible to make the system much more compact with reduced unit cost and power consumption. What is more, the interface to the next higher level is simplified.

The invention also makes it possible to operate at a high speed with no risk of starving the PCM link.

Further, the design of the system makes it compatible with protocols differing from the HDLC format, simply by replacing a single circuit per 16-channel or 32-channel transmitter.

SUMMARY OF THE INVENTION

The invention consists in a system for transmitting HDLC frames on a multi-channel PCM type link, the system comprising HDLC frame building first means for each transmission channel feeding second means for inserting the HDLC frames in a time-division multiplexing PCM format, characterized in that said first and second means are constituted by a single transposition buffer memory with a read cycle distinct from the write cycle cooperating with a single single-channel HDLC frame formatting circuit, said memory being accessed in write mode by said formatted HDLC frames and being accessed in read mode under the control of means for selective sampling in the memory of data building for successive blocks of interleaved channels of the PCM frame.

The transmission system thus uses a single HDLC formatting circuit and a single memory.

Said buffer memory advantageously comprises at least N circular FIFO type memory segments corresponding to the N channels carried on the PCM link. In this way each of said memory segments comprises a separate write pointer and there is a common read pointer for all the segments.

The system preferably includes a circuit for selectively feeding the HDLC circuit comprising a processor receiving the information supplied by the write and read pointers of said buffer memory. In this way the processor manages the filling of the memory segments to avoid starving the PCM link. It comprises, for example, logic for selectively feeding to the HDLC circuit data for priority filling of the least full segment of the buffer memory, at least when the amount of data stored in said memory segment is less than a predetermined threshold.

Said processor of the HDLC circuit selective feed circuit advantageously cooperates with a local memory for temporary data storage. The feed circuit processor and the single HDLC circuit then preferably cooperate in a master/slave relationship via a bus the data signalling rate on which is determined by receive acknowledgements sent by the single HDLC circuit.

According to one important characteristic of the invention, the selective feed circuit processor supplies the data bytes to the HDLC circuit accompanied by information identifying the current, end of frame and synchronization bytes. The identification of an end of frame byte commands the corresponding HDLC formatting operation. Moreover, the identification of the synchronization bytes commands HDLC circuit deactivation and bypassing means to enable loading of the synchronization byte of each PCM frame directly into the buffer memory.

To further improve the flexibility of the system, in particular with regard to irregular supply of source frames, it advantageously comprises means for masking the clock signals controlling said HDLC circuit and/or the means for sequencing writing into said buffer memory in the event of insufficient data being supplied to the HDLC circuit.

Other characteristics and advantages of the invention will emerge on reading the following description of one preferred embodiment given by way of purely illustrative and non-limiting example and from the appended drawings.

DETAILED DESCRIPTION OF THE INVENTION

Figure 1:
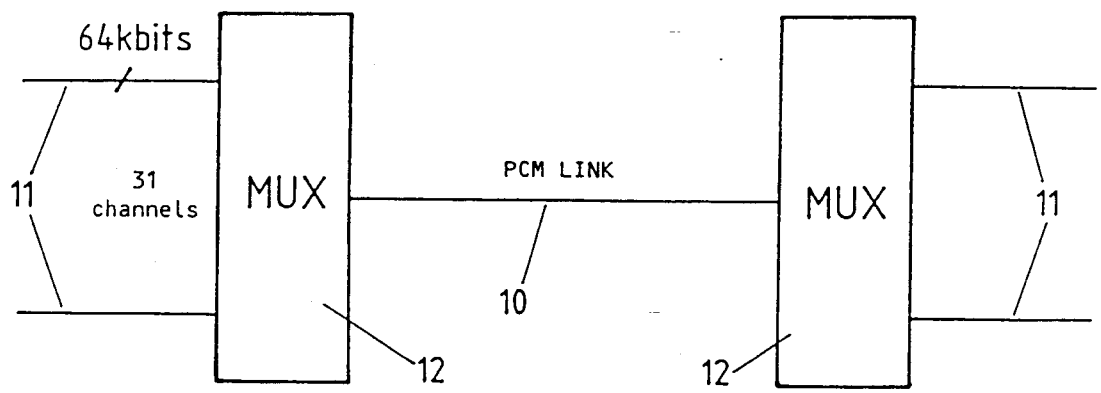
FIG. 1 is a schematic showing the transmission subsystem of a 31-channel PCM link incorporating the transmission system in accordance with the invention.

As schematically shown in FIG. 1, the embodiment to be described hereinafter relates to a PCM type link 10 made up of 31 HDLC channels 11 multiplexed (at 12) with a synchronization 32nd channel (PCM standard).

To make this example more specific, it may be assumed that the HDLC channels operate at a data signalling rate of 64 kbit/s on a CEPT PCM type link (2.048 Mbit/s) using a CCITT No 7 type transmission protocol.

Figure 2:
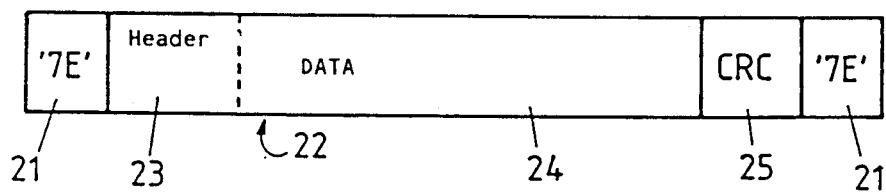
FIG. 2 is a schematic showing the structure of an HDLC frame.

FIG. 2 shows the structure of an HDLC frame, comprising:

a flag "7E" 21 for separating the frames; the code "7E" corresponds to the binary sequence 0 1 1 1 1 1 1 0;

N data bytes 22; the number N of bytes varies according to the software (1,000 bytes maximum, for example); these data bytes include the message header 23 consisting for example of a frame number, a number for the last frame sent by the remote system, a length indication for the message in the HDLC frame and the actual body of the message 24;

two frame validation bytes; these bytes are CRC (Cyclic Redundancy Check) bytes and their value depends on the bits of the frame; these two bytes consist, for example, of the remainder obtained on dividing the frame by a particular polynomial.

The HDLC frames are transmitted in succession on each channel with a frame separator 21 between successive frames. If there is no frame to transmit the separator flags 21 are transmitted continuously.

The building of these HDLC frames from the source data sequences requires the use in the transmitter of a specific USART (Universal Synchronous/Asynchronous Receiver/Transmitter) device, the functions of which include:

eliminating occurrences of the symbol "7E" within the data frame to avoid any possibility of ambiguity with respect to the end of frame flags 21; this function is based on the so-called "transparency" rule which entails inserting zeroes into the useful data sequence immediately five consecutive bits at one are detected;

computing the two CRC bytes 25 to insert them at the end of the frame;

inserting frame separation flags 21 between HDLC frames.

Of course, a complementary component is used in the receiver part to recover the tranmitted data by implementing the following functions:

detecting and eliminating frame flags 21;

verifying that the useful data sequence 22 transmitted matches the two CRC bytes 25; if not, the receiver switches to an "error" state and, for example, commands retransmission of the frame;

extracting the zeroes inserted into the frame on transmission, according to the transparency rule.

Figure 3:
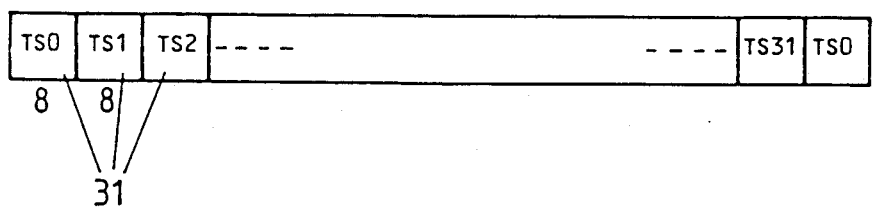
FIG. 3 is a schematic showing the structure of a PCM frame.
Figure 4:
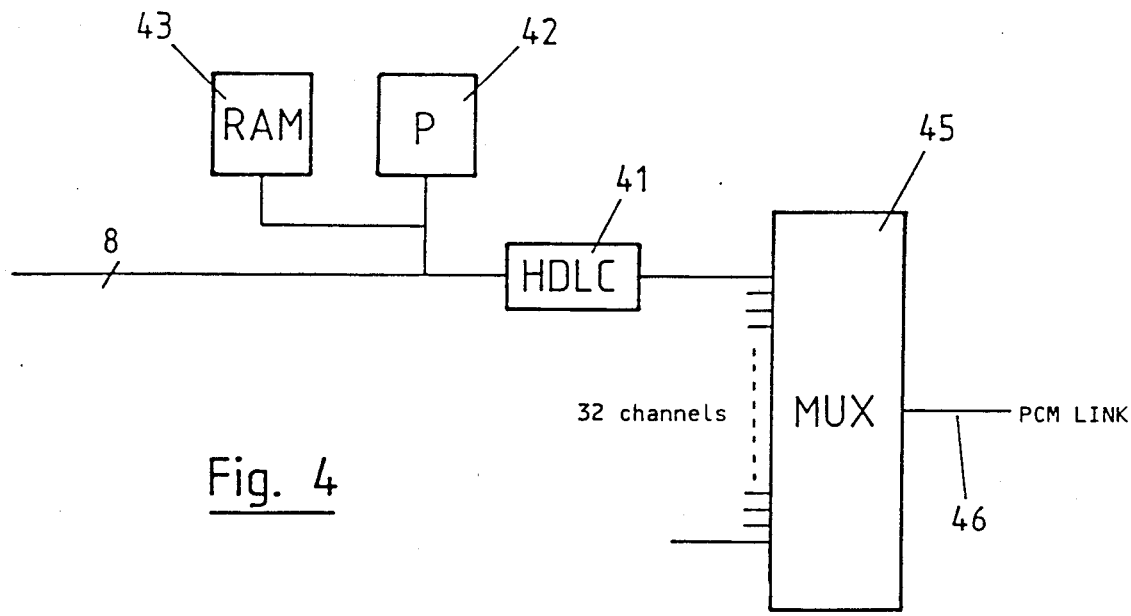
FIG. 4 shows a known implementation of a system for transmitting HDLC frames on a PCM type channel with separate HDLC processing for each channel.

FIG. 3 shows the structure of a PCM frame.

The data signalling rate of a multiplexed PCM frame built from $32 \times 64$ kbit/s channels is $32 \times 64$ kbit/s=2.048 Mbit/s. The data is transmitted in consecutive blocks of 256 bits as shown in FIG. 3, repeated continuously. The block comprises 32 time slots 31 (TS0, TS1, ..., TS31) each comprising eight bits. The byte TS0 contains a sychronization code. The bytes TS1 through TS31 each correspond to a different transmission channel. From the point of view of the transmitter or the receiver, the data from each subscriber is sampled and sent every 256 bits, multiplexed with the data of the parallel channels.

Where necessary, the byte TS16 corresponds to signalling data specifying the use of each of the bytes TS1, TS2, etc.

Figure 5:
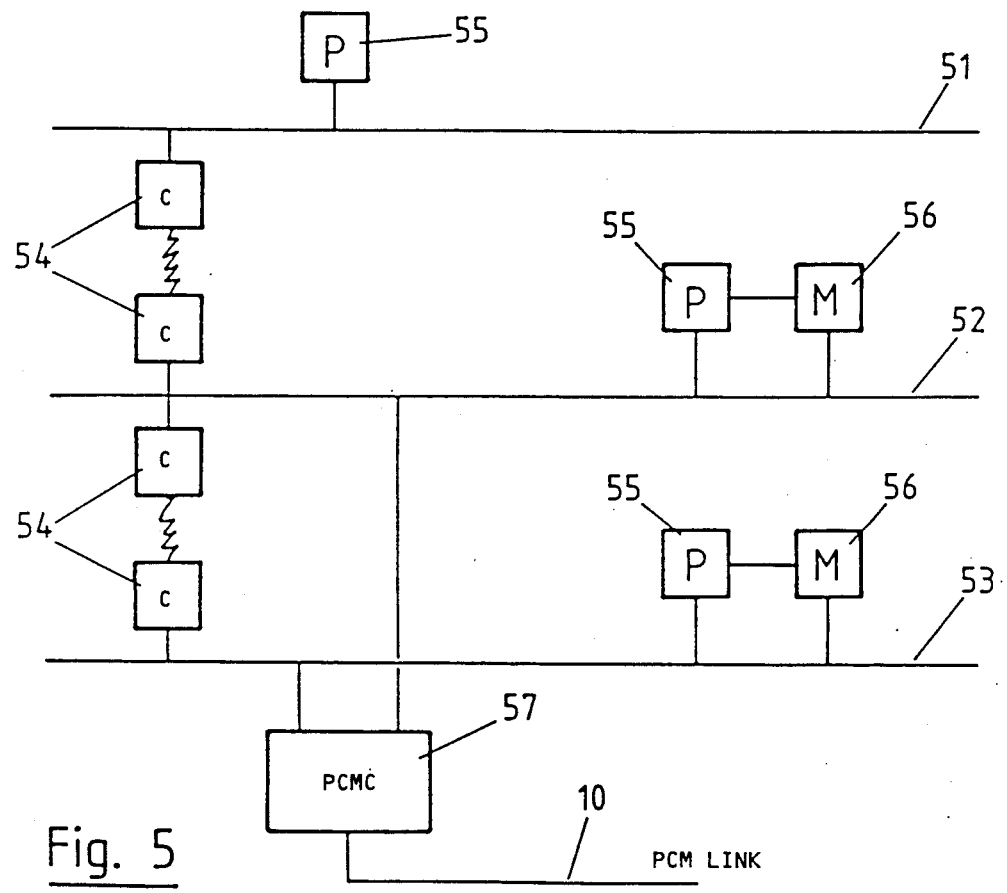
FIG. 5 is a schematic showing the implementation of a PCM controller in a data switch.

The embodiment of the system in accordance with the invention will be described in more detail in relation to a data switch as shown in FIG. 5.

A data switch of this kind comprises, for example, a multibus multiprocessor system including:

a management bus;

at least one frame switching bus adapted to process received data and to regroup it for retransmission to appropriate transmission lines;

connecting buses to the transmit/receive lines.

The system buses 51, 52, 53 are interconnected by pairs of bus controllers 54 which enable the processors 55 connected to each bus to communicate with each other or with slave modules such as memories 56.

Figure 6:
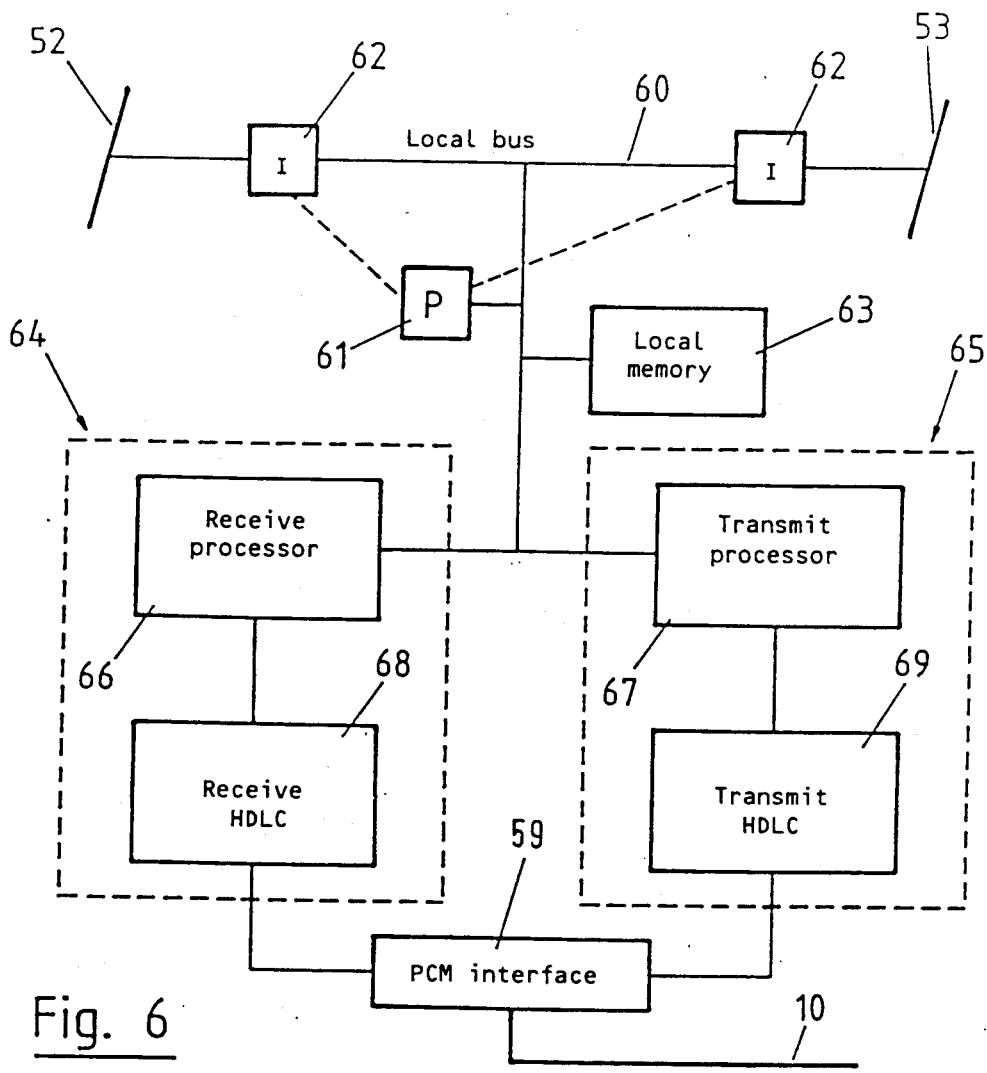
FIG. 6 shows a PCM controller to which the transmission system in accordance with the invention can be applied.

The connection to a PCM link 10 is made through a PCM controller 57 preferably connected in parallel to two buses 52, 53 for security reasons. Only one of the two interfaces between the PCM controller 57 and the buses 52, 53 is active at any particular time, under the control of a management processor 61 (FIG. 6). The second interface may be activated should the first fail, for example.

FIG. 6 shows the structure of a PCM controller of a type in which the invention may be used.

The PCM controller is connected to the two buses 52, 53 of the data switch by means of two tristate buffer circuit type isolating circuits 62 controlled by the management processor 61.

The management processor 61 has additional functions:

it cooperates with the processors connected to the buses 52, 53 to manage the source data frames and the error rates on the HDLC channels;

it takes part in management of the local memory 63 of the PCM controllers;

it monitors congestion on and the data signalling rate of the local bus 60 of the PCM controller and manages the routing of data on the local bus 60;

it manages time-delays activated on transfer of data on the bus, pending acknowledgements of reception;

it sends instructions to the transmit processor 67 over the PCM link 10.

The PCM controller further comprises a local memory 63 and two processing branches 64, 65 respectively corresponding to the receive and transmit circuits of the controller. These circuits 64, 65 cooperate with a common PCM interface 59 connected to the PCM link 10. Each of the circuits 64, 65 includes a processor 66, 67 and an HDLC circuit 68, 69 incorporating the transmit or receive USART functions as described above.

The invention is more particularly concerned with the structure and the operation of the circuit 65 in conjunction with the local memory 63 in respect of operations for transmitting HDLC frames on the PCM FIG. 10.

Figure 7:
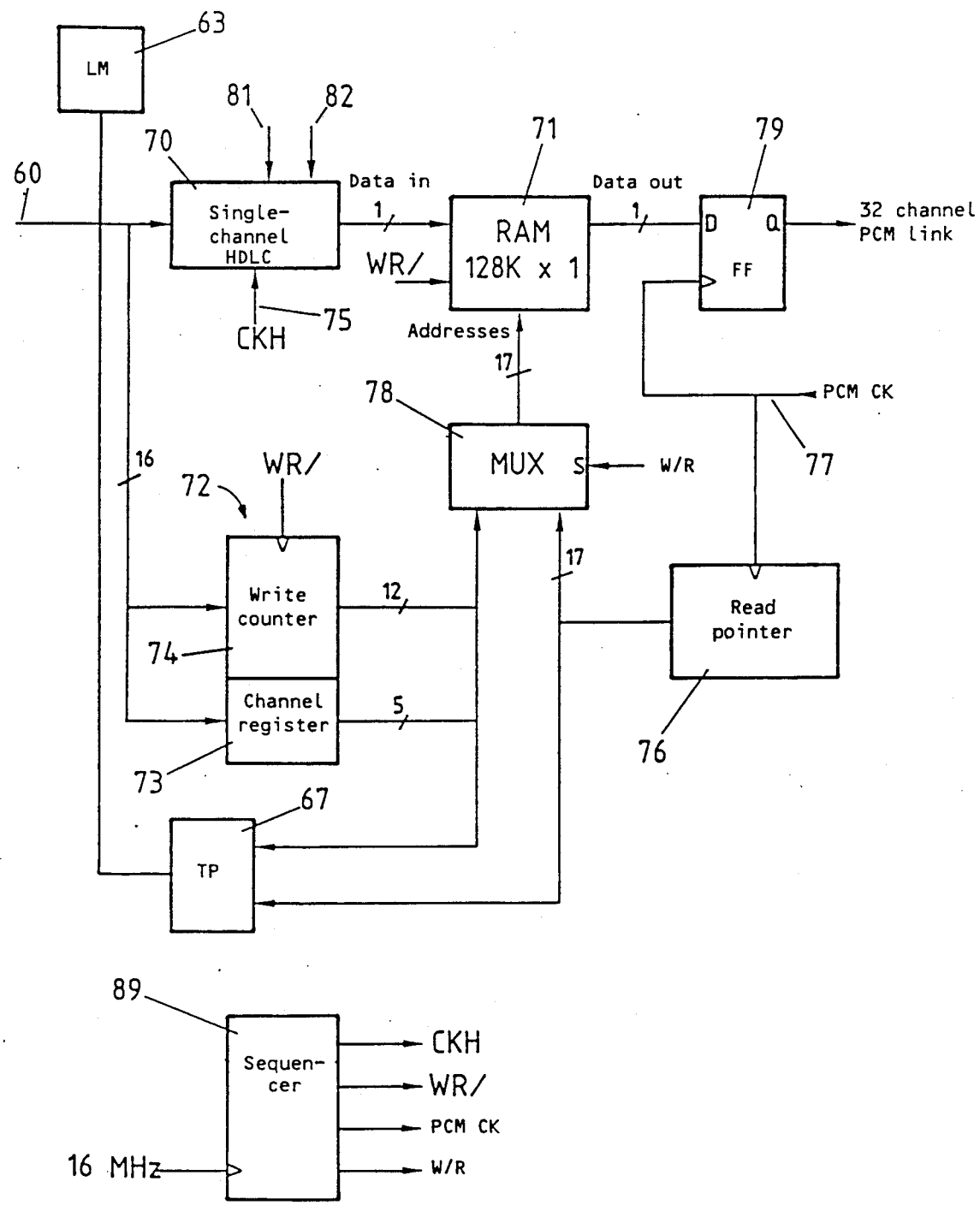
FIG. 7 shows a preferred embodiment of the HDLC operator of the transmission system in accordance with the invention.

FIG. 7 is a schematic showing the main component parts of the transmission system in accordance with the invention.

It shows:

the transmit processor 67 and the local memory 63 of the PCM controller forming the circuit feeding the HDLC circuit 70;

a single, single-channel HDLC operator 70 operating on the 32 channels of the PCM link on a timesharing basis;

a 128 kbit monolithic time slot interchange memory 71 which stores the frames or the flags from the HDLC circuit 70;

a write pointer 72 comprising a 5-bit register 73 containing the channel number and a 12-bit counter 74 incremented at the timing rate of the transmit clock 75 of the HDLC circuit 70;

a read pointer 76 comprising a 17-bit binary counter incremented at the timing rate of the PCM clock 77;

a multiplexer 78 which cross-connects the addresses from the two pointers 72, 76 according to the type of cycle (read or write);

a sequencer 89 which controls the multiplexer 78 and supplies the clocks for the pointers 72, 76 and the HDLC circuit 70;

a flip-flop 79 for memorizing the current state of the bit sent to the PCM link.

The processor 67 also receives status information from the write pointer 72 and read pointer 76.

Figure 8:
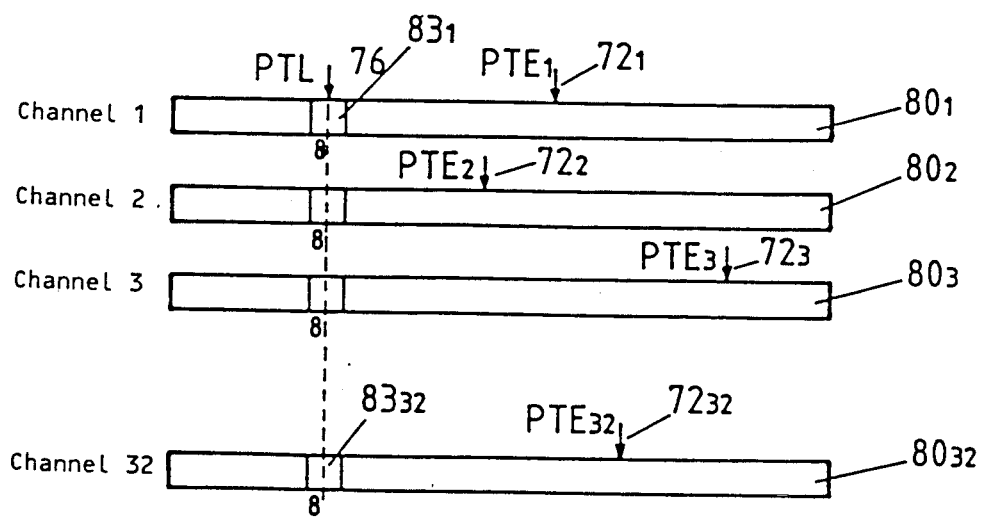
FIG. 8 is a schematic showing the structure of the single transposition memory of the operator from FIG. 7.

The structure of the memory 71 will be described with reference to FIG. 8.

It is a 128 k×1-bit memory with separate input and output and a cycle time of 122 ms. Every 488 ms three cycles are allocated to writing and one cycle to reading: the read cycles are always executed, yielding a binary bit stream at 2.048 Mbit/s. The write cycles are executed only during transmission of frames by the processor. The memory is divided into 32 blocks $80_1$ through $80_{32}$ each comprising four bits and each assigned to one PCM channel. The memory is used as a circular buffer memory. The processor 67 therefore has to manage for each block $80_1$ through $80_{32}$ a specific 12-bit write pointer $72_1$ through $72_{32}$ memorizing between write operations into its block the address of the last bit written in the block. The read pointer 76 is common to all the blocks because it is derived from a counter synchronized with the PCM clock 77; the less significant bits of this counter scan through the channel numbers at the rate of one channel every eight bits, in accordance with the CEPT PCM structure (see FIG. 3 and table 1 below).

As already mentioned, the processor 67 can read the write pointer 72 and the read pointer 76; by comparing them it can tell how full a memory block $80_1$–$80_{32}$ is and whether it can send a new HDLC frame on the corresponding channel. To this end the processor 67 includes selective feed logic to be described in detail later.

The stages in transmitting an HDLC frame by means of the system from FIG. 7 are therefore as follows:

the processor 67 writes the number of the channel on which it wishes to transmit the frame into the register 73 of the write pointer 72;

it loads the counter 74 of the write pointer 72 with the value that it saved at the end of the last frame sent on the same channel;

it then writes the frame byte by byte into the HDLC circuit 70 which inserts the necessary zeroes and computes the CRC; transmission is at an average rate of 6 Mbit/s with automatic locking up of the transmit clock if the microprocessor does not supply the next byte quickly enough, by means of a masking process described later;

after writing the last byte, the processor 67 writes the "end of frame" command which causes the CRC to be sent;

it then looks for an "end of transmission" flag which tells it that it can read and save the channel write pointer;

the processor 67 can then process another channel.

The data signalling rate on the local bus 60 is determined by the HDLC circuit 70. This HDLC circuit cooperates with the processor 67 in a master/slave relationship. Each time a data byte is received the HDLC circuit 70 sends a receive acknowledgement to the processor 67 which will indirectly command the transmission of the next byte. This process makes it possible to avoid the risk of saturation of the HDLC circuit.

The HDLC circuit has two input lines 81, 82 the states of which identify the current, end of frame and synchronization bytes transmitted to it by the processor 67. The line 81 carries, for example, the start/end of message information. The line 82 is activated as each synchronization byte TS0 of the PCM frame is transmitted.

This implementation of the system for generating the TS0 bytes in the HDLC circuit makes it possible to dispense with a dedicated circuit at the output of the operator from FIG. 7, which would require a set of registers and a multiplexer prior to driving the PCM link. In this way complexity is limited to a single component, the processor 67.

The specific command to transmit the TS0 byte, which is transmitted over the line 82, leads to deactivation of the zero insertion algorithm of the HDLC circuit 70 and therefore its bypassing or circumvention, so to speak, without interrupting the feed to the memory 71. The TS0 bytes are stored in the specific memory block of the memory 71 which is scanned cyclically by the common read pointer 76.

The lines 81 and 82 are advantageously activated according to the content of a control register accompanying the data register transmitted by the processor 67, for each byte. Of course, those skilled in the art may substitute for this any alternative device with the same function.

As already mentioned, the memory 71 is read by means of a single read pointer 76. The general principle is to sample the byte $83_1$ through $83_{32}$ corresponding to the position of the read pointer 76 in each of the memory blocks $80_1$ through $80_{32}$, respectively. Thus to some extent the memory 71 operates as a transposition memory since the writing of the bytes is effected by stacking in each appropriate circular FIFO block while the data is read transversely across all the data blocks rank by rank as the read pointer 76 is incremented.

Table 1 shows the correspondance between the addresses issued by the read pointer 76 and write pointer 72.

TABLE 1

| TRANSPOSITION MEMORY ADDRESSING | | |
|---|---|---|
| 128K RAM address | Write pointer | Read pointer |
| A0 | PTE0 | NB0 |
| A1 | PTE1 | NB1 |
| A2 | PTE2 | NB2 |
| A3 | NV0 | NIT0 |
| A4 | NV1 | NIT1 |
| A5 | NV2 | NIT2 |
| A6 | NV3 | NIT3 |
| A7 | NV4 | NIT4 |
| A8 | PTE3 | PTL3 |
| A9 | PTE4 | PTL4 |
| A10 | PTE5 | PTL5 |
| A11 | PTE6 | PTL6 |
| A12 | PTE7 | PTL7 |
| A13 | PTE8 | PTL8 |
| A14 | PTE9 | PTL9 |
| A15 | PTE10 | PTL10 |
| A16 | PTE11 | PTL11 |

Key:
NVx: channel number
NBx: bit number in block TSi of PCM frame
NITx: code i of block TSi of PCM frame
PTLx: read pointer
PTEx: write pointer The memory is read and written on 17 bits A0–A16 as shown in the table (128 kbytes=$2^{17}$). The write pointer includes a 12-bit counter PTE0 through PTE11 in the middle of which are interpolated the five bits of the fixed channel number register NV0 through NV4. The read pointer addresses bit by bit each byte NB0 through NB2, by scanning through the 32 codes i of the blocks TSi of each PCM frame (NIT0 through NIT4) for each of the PCM frames to be transmitted in succession (PTL3 through PTL11).

The average frequency of the transmit clock of the HDLC circuit 70 is 6 MHz. Its instantaneous frequency is 8 MHz. This clock is provided by the sequencer 79 and also provides the clock for the write pointer 72.

It has a specific feature enabling the transmit timing rate to be slaved to the microprocessor 67 and avoiding starvation situations. When the HDLC circuit 70 has finished serializing a character and the next is not yet written the sequencer locks up the transmit clock until the next character is written. The processor 67 therefore "sees" an asynchronous circuit, by virtue of the cooperation of this masking mechanism with the buffer memory 71. This feature also makes it possible to break down an HDLC frame into multiple blocks provided that the HDLC circuit 70 enables saving of the CRC and the "1" counter.

Locking up the transmit clock also has the advantage of enabling transmission on any channel of a fixed repetitive value (a free channel code or a TS0 syncrhonization code, for example) instead of HDLC frames. To this end it suffices to program the HDLC circuit in character mode (serialization without "0" insertion and without CRC) and to send one or more times 512 bytes having the required value to fill the 4,096 bits of the corresponding buffer; the content of this buffer is then transmitted idenfinitely on the PCM link.

Comparing the average rate of writing the memory (6 Mbit/s) with the reading rate of 2 Mbit/s shows that even with 31 active channels rated at one erlang the transmit miccroprocessor 67 allots only one third of its time to writing frames into the HDLC circuit 70.

The free time of the microprocessor 67 may in particular be used for management of the relative priorities with which blocks are fed to the memory 71.

This is achieved by having the processor 67 track the read pointer 76 and write pointer 72. The objective of the feed priority management logic is to avoid starvation in one block which would interrupt the PCM link followed by the obligation to repeat all frames being transmitted.

The processor 67 therefore advantageously incorporates logic allowing for the following parameters:

the separation in each memory block between the specific block pointer 72i and the common read pointer 76;

detection of blocks in which the write pointer/read pointer separation is below a predetermined threshold, the so-called "starvation risk threshold";

processing (by reading source frames waiting in the local memory 63) the size of messages to transmit on the corresponding channels before transmission of the data addressed to the memory block 71 in respect of which there is any starvation risk;

interruption of the normal cycle if said intermediate messages are too long, so as to give priority to feeding said block at risk of a starvation situation.

For managing this logic the processor 67 has, for example, 32 transmit mailboxes each corresponding to one transmit channel. Each mailbox is identified by a number and comprises a busy bit, an instruction and the logical frame address of a table giving the frame number to send. When the mailbox has been read the busy bit is reset to "0" and a new transmission instruction can be executed on the channel.

An alternative to modifying the priority of feeding the HDLC circuit 70 by data addressed to the memory 71, to avoid starvation in a block, is to send to this block either neutral end of frame flags or padding frames. This solution has the advantage of not imposing any modification of the logic for incrementing the addressing bit of the memory 71 in write mode.

For the 128 kbit memory type shown in FIG. 7 in a tested implementation, the alarm threshold was set at 320 bits for each block. The pointer scanning logic, using transmission of padding frames or end of HDLC frame flags, had a maximum scanning cycle time of 5 ms.

There is claimed:

1. System for transmitting HDLC frames on a multichannel PCM type link, the system comprising HDLC frame building first means for each transmission channel feeding second means for inserting the HDLC frames in a time-division multiplexing PCM format, wherein said first and second means are constituted by a single transposition buffer memory with a read cycle distinct from the write cycle cooperating with a single single-channel HDLC frame formatting circuit, said memory being written with said formatted HDLC frames and read under the control of means for selective sampling in said memory of data for building successive blocks of interleaved channels of said PCM frame.

2. System according to claim 1 wherein said buffer memory comprises at least N circular FIFO type memory segments corresponding to N channels routed onto said PCM link.

3. System according to claim 2 wherein each of said memory segments comprises a respective write pointer and in that said memory comprises a single read pointer for all said memory segments.

4. System according to claim 1 wherein said buffer memory includes write and read pointers and said system further including a circuit for selectively feeding said HDLC circuit comprising a microprocessor receiving data supplied by said write and read pointers of said buffer memory.

5. System according to claim 4 wherein said microprocessor of said circuit for selectively feeding said HDLC circuit cooperates with a local memory for temporary data storage.

6. System according to claim 4 wherein said microprocessor comprises a logic circuit for selectively feeding said HDLC circuit with data whereby priority is given to filling a least full segment of said buffer memory at least when the quantity of data in said memory least full segment is lower than a predetermined threshold.

7. System according to claim 4 wherein said microprocessor of said circuit for selectively feeding said HDLC circuit and said single HDLC circuit cooperate according to a master/slave relation through a bus the data signalling rate of which is determined by acknowledgements sent by said single HDLC circuit.

8. System according to claim 4 wherein said selective feed circuit supplies data byte by byte to said HDLC circuit.

9. System according to claim 8 wherein said microprocessor of said selective feed circuit supplies said data bytes to said HDLC circuit accompanied by data identifying the current, frame end and synchronization bytes.

10. System according to claim 1 comprising means for de-activating and bypassing said HDLC circuit.

11. System according to claim 10 wherein said de-activating and bypassing means are activated for loading synchronization bytes of each PCM frame into said buffer memory.

12. System according to claim 1 comprising means for masking clock signals controlling said HDLC circuit and/or means for sequencing writing in said buffer memory in case of data starvation in the feed to said HDLC circuit.

13. System according to claim 1 wherein said memory is accessed by four-period cycles comprising a read period and three write periods.

* * * * *